United States Patent
Hanks et al.

(10) Patent No.: US 8,226,334 B2
(45) Date of Patent: Jul. 24, 2012

(54) VARIABLE DIAMETER CUTTING TOOL

(75) Inventors: Ryan L. Hanks, Shipman, IL (US); Eric J. Stern, Valmeyer, IL (US); Jared L. Bolin, New Athens, IL (US)

(73) Assignee: The Boeing Company, Chicago, IL (US)

( * ) Notice: Subject to any disclaimer, the term of this patent is extended or adjusted under 35 U.S.C. 154(b) by 1066 days.

(21) Appl. No.: 12/144,510

(22) Filed: Jun. 23, 2008

(65) Prior Publication Data

US 2009/0317198 A1  Dec. 24, 2009

(51) Int. Cl.
  *B23C 5/12* (2006.01)
  *B23C 5/10* (2006.01)
(52) U.S. Cl. .......................... 407/61; 407/59
(58) Field of Classification Search .............. 407/53–55, 407/60–63; 408/204
  See application file for complete search history.

(56) References Cited

U.S. PATENT DOCUMENTS

| | | | | |
|---|---|---|---|---|
| 1,000,067 A | * | 8/1911 | Bennett ......................... | 408/224 |
| 1,387,994 A | * | 8/1921 | Lewis ............................ | 408/224 |
| RE16,817 E | * | 12/1927 | smith ........................... | 408/224 |
| 2,786,373 A | | 3/1957 | Patton | |
| 3,412,733 A | * | 11/1968 | Ross ............................... | 606/81 |
| 3,422,915 A | * | 1/1969 | Watts ............................ | 175/388 |
| 3,548,687 A | * | 12/1970 | Holloway ..................... | 408/206 |
| 3,794,129 A | * | 2/1974 | Taylor ............................ | 175/391 |
| 3,811,163 A | * | 5/1974 | Frederick et al. ............... | 407/11 |
| 3,898,895 A | * | 8/1975 | Taylor ............................ | 76/102 |
| 4,285,618 A | * | 8/1981 | Shanley, Jr. .................... | 407/54 |
| 4,411,563 A | | 10/1983 | Moon | |
| 4,586,858 A | * | 5/1986 | Kubota ........................ | 408/224 |
| 4,764,059 A | * | 8/1988 | Wale .............................. | 407/42 |
| 5,022,798 A | | 6/1991 | Eckman | |
| 5,027,914 A | * | 7/1991 | Wilson ......................... | 175/406 |
| 5,071,294 A | * | 12/1991 | Suzuki et al. ................. | 408/145 |
| 5,122,040 A | * | 6/1992 | Fields ........................... | 418/55.2 |
| 5,160,232 A | * | 11/1992 | Maier ........................... | 408/223 |
| 5,282,705 A | * | 2/1994 | Shiga et al. .................... | 408/211 |
| 5,312,208 A | * | 5/1994 | Shiga et al. .................... | 408/224 |

(Continued)

FOREIGN PATENT DOCUMENTS

DE  19903276  8/2000

(Continued)

OTHER PUBLICATIONS

ISCAR, Inc., "Cutting Tools—Metal Working Tools", Jan. 2007, available at <http://www.iscar.com/ProductUpdate/ProductUpdateSubDetails.asp?CountryID=1&ProductUpdateDetailID=482>.
International Search Report, PCT2008051410, dated Mar. 7, 2008.

*Primary Examiner* — Boyer D Ashley
*Assistant Examiner* — Sara Addisu
(74) *Attorney, Agent, or Firm* — Novatech IP Law; Wilson Royer (57) ABSTRACT

A cutting tool includes a tool body having proximal and distal ends and defining a central axis. The tool body includes a shank portion and a fluted portion. The shank portion may be configured to be rotatably engageable to a milling machine. The fluted portion may include a plurality of teeth disposed about a circumference thereof and being formed at a radius relative to the central axis. In one embodiment, the teeth may be divided into first and second tooth sections with the teeth in the second tooth section being formed at a reduced radius relative to the teeth in the first tooth section.

20 Claims, 5 Drawing Sheets

U.S. PATENT DOCUMENTS

| | | | |
|---|---|---|---|
| 5,908,269 A * | 6/1999 | Cox | 407/59 |
| 6,164,876 A * | 12/2000 | Cordovano | 407/59 |
| 6,322,296 B1 * | 11/2001 | Wetli et al. | 407/42 |
| 6,511,265 B1 * | 1/2003 | Mirchandani et al. | 407/53 |
| 6,913,428 B2 | 7/2005 | Kress | |
| 7,014,394 B2 | 3/2006 | Inglis | |
| 7,544,021 B2 * | 6/2009 | Flynn | 407/59 |
| 7,862,263 B2 * | 1/2011 | van Iperen | 407/60 |
| 2008/0193234 A1 | 8/2008 | Davancens et al. | |

FOREIGN PATENT DOCUMENTS

| | | |
|---|---|---|
| DE | 19903276 A1 * | 8/2000 |
| GB | 2404890 | 2/2005 |
| JP | 360090605 A | 5/1985 |
| JP | 11058117 | 3/1999 |
| WO | 9613352 | 5/1996 |
| WO | 9731741 | 9/1997 |

* cited by examiner

90 — PROVIDING A CYLINDRICAL TOOL BODY HAVING A SHANK PORTION AND A FLUTED PORTION HAVING N NUMBER OF TEETH SEPARATED BY FLUTES

92 — FORMING N/4 OF THE TEETH OF EQUAL RADII IN A PAIR OF DIAMETRICALLY OPPOSED FIRST TOOTH SECTIONS ON A CIRCUMFERENCE OF THE FLUTED PORTION

94 — FORMING N/4 OF THE TEETH OF EQUAL RADII IN A DIAMETRICALLY OPPOSED PAIR OF SECOND TOOTH SECTIONS ON A CIRCUMFERENCE OF THE FLUTED PORTION SUCH THAT THE TEETH IN THE SECOND TOOTH SECTIONS ARE FORMED AT A RADIUS THAT IS LESS THAN THE RADIUS OF THE TEETH IN THE FIRST TOOTH SECTION BY AN AMOUNT AT LEAST EQUAL TO THE RADIAL RUNOUT AND SUCH THAT THE SECOND TOOTH SECTIONS ARE ANGULARLY COINCIDENT WITH THE FIRST ANGULAR POSITION

VARIABLE DIAMETER CUTTING TOOL

CROSS-REFERENCE TO RELATED APPLICATIONS (Not Applicable)

STATEMENT RE: FEDERALLY SPONSORED RESEARCH/DEVELOPMENT (Not Applicable)

FIELD

The present invention relates generally to rotary cutting tools and, more particularly, to a cutting tool or end mill having teeth of varying teeth radii in order to reduce or prevent surface feed marks normally associated with high feed rates.

BACKGROUND

End mills are commonly-used cutting tools for machining work pieces and are typically engaged to a rotary turning machine such as a milling machine. The milling machine rotatably drives the end mill to shape the work piece. End mills are typically provided as elongate, cylindrically shaped elements and may include anywhere from 2 to 20 or more teeth or flutes that are formed on an outer perimeter of the end mill. As distinguished from drill bits which are typically used for forming holes in an axial direction, end mills can be used for shaping work pieces in all directions including, without limitation, axial (i.e., vertical), lateral (i.e., sideways) and angular directions.

Each tooth of the end mill is configured to remove a small amount of material as the end mill is rotatably driven relative to the work piece. Amongst may possible shapes, end mills can have a blunt or flat end or they may be rounded with a hemispherical or semispherical end such as a ball end and may be used in CNC milling machines in order to produce a variety of different part geometries.

End mills may be engaged at one end to a chuck or collet of a spindle which may be movable in vertical, lateral and/or angular orientations depending upon the capabilities of the milling machine (i.e., whether the milling machine is 2-axis, 3-axis, 5-axis, etc.). End mills are typically fabricated of relatively hard materials such as high speed steel or tungsten carbide to provide resistance against deflection and also to maintain the integrity of the cutting tool under load. Extremely hard coatings may be formed on the cutting teeth to allow the end mill to operate under high temperature, high pressure machining conditions and to increase the life of the end mill.

In an effort to increase productivity and reduce the amount of time required to machine a work piece, the end mill may be provided with a relatively large number of cutting teeth such that the end mill may cut relative to the work piece at a high feed rate for a given chip load. Chip load is a measure of the amount of material removed by each tooth during one revolution of the end mill. In this regard, an end mill having a high tooth-count (e.g., 20 teeth) may be capable of higher feed rates for the same chip load as compared to an end mill having a relatively low tooth-count (e.g., 4 teeth).

Figure 1:
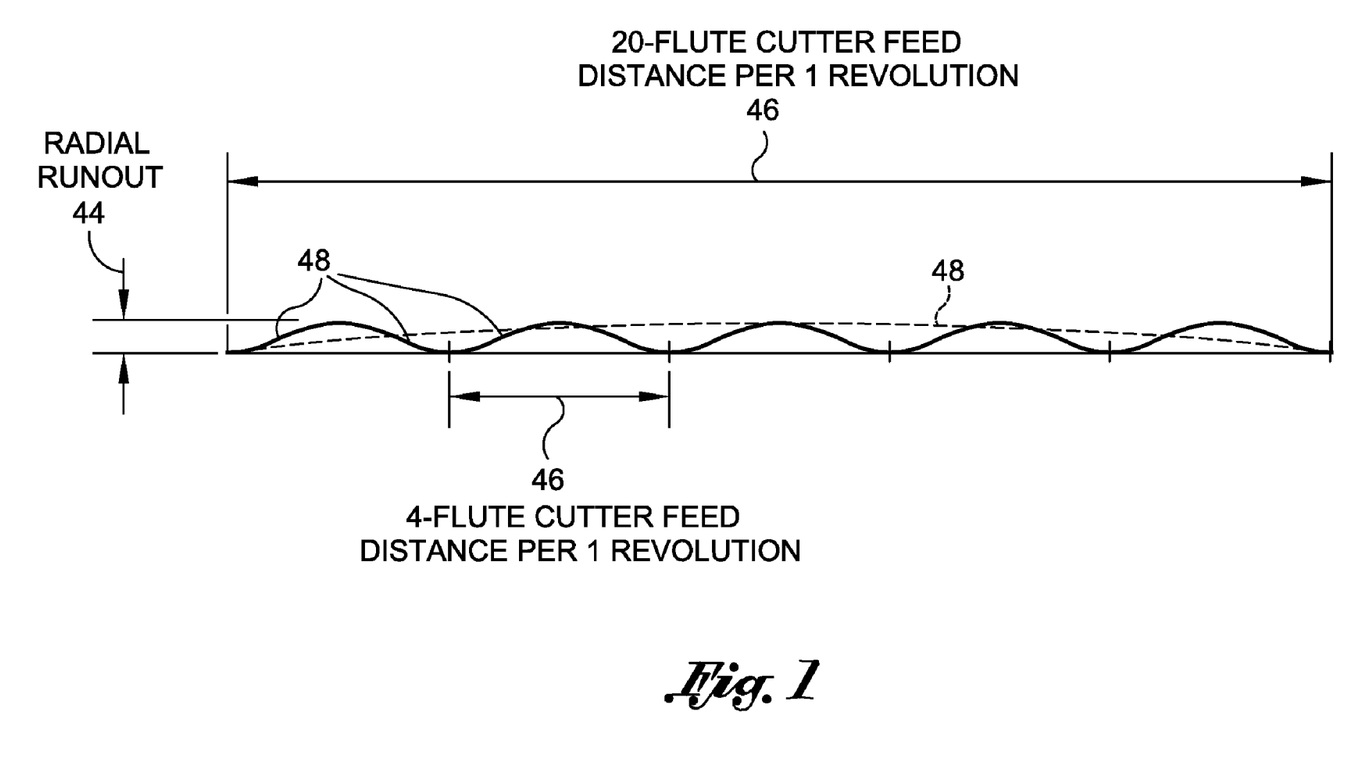
FIG. 1 is a schematic illustration of the effects of radial runout on a machined surface for a low tooth-count cutting tool or end mill as compared to a high tooth-count cutting tool.

Referring to FIG. 1, shown is a schematic illustration of a straight line tool path of a 20-tooth end mill superimposed over the tool path of a 4-tooth end mill. In the exemplary illustration, for a chip load of 0.003 inches per cutting tooth, the 4-tooth end mill has a feed distance per revolution (indicated by reference numeral 46) of 0.012 inches. In this example, the 4-tooth end mill must rotate through five revolutions in order to travel 0.060 inches. In comparison, for the same chip load (i.e., 0.003 inches), the 20-tooth end mill has a feed distance per revolution 46 of 0.060 inches and must only rotate through a single revolution to cover the same distance traveled in 5 revolutions by the 4-tooth end mill. Therefore, for the same rotational speed, the 20-tooth end mill has a higher feed rate relative to the feed rate of the 4-tooth end mill.

Unfortunately, although increased feed rates are possible, several disadvantages are associated with high tooth-count end mills. For example, radial runout is a common phenomenon associated with rotary machining operations and may be generally defined as a variation in the rotating radius of a rotating cutting tool as compared to an ideally uniform radius of rotation. Radial runout may result in the formation of surface feed marks as the end mill is driven through the work piece. Such surface feed marks may appear in machined surfaces as peaks and valleys or scallops and may require time-consuming hand-finishing operations in order to smooth out the feed marks.

Referring back to FIG. 1, shown in solid are five feed marks represented as slight arcs that are formed in the workpiece surface 48 as a result of radial runout 44 in a 4-tooth end mill as it rotates through five revolutions. In comparison, shown in dashed is a single feed mark represented as a single arc in the workpiece surface 48 by the 20-tooth end mill as a result of the same amount of radial runout 44.

Because the feed marks created by the low tooth-count (e.g., 4-tooth) end mill overlap with one another, such overlapping gives the appearance of a smoother surface profile than the surface profile created by the high tooth-count (e.g., 20-tooth) end mill when viewed without magnification. As such, the feed marks created by low tooth-count end mills are more easily disguised than feed marks created by high tooth-count end mills.

In an effort to reduce or eliminate hand finishing of parts machined by high tooth-count end mills, some manufacturers have reverted to the use of low tooth-count end mills despite the lower feed rates. Unfortunately, the use of low tooth-count end mills results in the production of machined parts at a much slower rate than would be achievable using end mills having a high tooth-count.

As can be seen, there exists a need in the art for a cutting tool or end mill which prevents the formation of feed marks in the cutting surface and thereby allows for an increase in tool feed rate in order to improve machining productivity. Furthermore, there exists a need in the art for a high tooth-count end mill which reduces or eliminates the formation of feed marks that are generated as a result of radial runout. Finally, there exists a need in the art for a cutting tool or end mill which is of low cost and which eliminates or reduces the amount of post processing or hand finishing of machined parts.

BRIEF SUMMARY

The above-described needs associated with cutting tools and the elimination of feed marks associated therewith are specifically addressed and alleviated by the various embodiments disclosed herein. More specifically, disclosed is a cutting tool or end mill which, in a broad sense, includes a plurality of teeth disposed about a circumference of the cutting tool and wherein the teeth are formed at varying radii. In one embodiment, the teeth of the cutting tool may be divided into a pair of diametrically opposed first tooth sections and a pair of diametrically opposed second tooth sections.

Each of the teeth in the first tooth sections are preferably formed at equal radii. Likewise, each of the teeth in the second tooth sections are preferably formed at equal radii. However, the teeth in the second tooth sections are preferably formed at a reduced radius relative to the radius of the teeth in the first tooth sections so as to minimize or eliminate the formation of surface feed marks generated in high tooth-count cutting tools.

The technical effects achieved by the disclosure as described herein is a breaking up of surface feed marks normally associated with a high inch-per-revolution feed rate. In this regard, the cutting tool or end mill as disclosed herein facilitates machining of metallic and nonmetallic work pieces at a relatively fast rate but without the associated feed marks. As is known in the art, such feed marks may require post-processing such as hand blending of the work piece.

In one embodiment, the cutting tool or end mill as disclosed herein may provide for very high feed rates such as greater than 100 inches per minute (IPM) when machining relatively hard materials such as titanium. In this regard, the cutting tool or end mill is configured such that the cutting edges of the teeth in each of the first and second or more tooth sections may dominate the radial runout of the cutting tool.

In one embodiment, the cutting tool or end mill may comprise a cylindrical or elongate tool body having opposing proximal and distal ends and defining a central axis extending along a length thereof. The tool body may be further divided into a shank portion disposed adjacent to the proximal end and a fluted portion disposed adjacent to the distal end. The shank portion is preferably configured to be engageable to and rotatably driven by a rotary milling machine. In this regard, the shank portion may include surface geometry or surface features which facilitate engagement of the tool body to the rotary milling machine such as via a collet of a spindle.

The fluted portion preferably includes the plurality of teeth which may be disposed about a circumference thereof and which are separated by flutes or grooves. The flutes or grooves may be of varying depth and can be configured as being straight (i.e., aligned with the central axis), helical, parabolic or any combination thereof. In this regard, the flutes or teeth may be arranged on the fluted portion at differing angles and may be at a constant helical angle or at varying helical angles along the length of the fluted portion. Each one of the teeth defines a tooth radius as measured from the central axis. Importantly, the teeth disposed on the fluted portion are variable in radii. In one embodiment, the teeth may be divided into one or more tooth sections with the teeth in each of the respective sections being formed at a reduced radius relative to the teeth in an adjacent one of the tooth sections.

In one embodiment, the teeth may be divided into at least one of first and second tooth sections with the teeth in each first tooth section preferably being formed at equal radii and the teeth in each of the second tooth sections preferably being formed at equal radii. The cutting tool may exhibit radial runout during rotation thereof which may be imparted due to spindle imbalance, rotating machinery dynamics and/or the geometry of the cutting tool itself. The teeth in the second tooth section are preferably formed at a radius that is reduced by an amount at least equal to the radial runout in order to prevent the creation of the surface marks in the work piece.

In one exemplary embodiment, the radial runout of the cutting tool may be at least approximately 0.001 inches. In this example, the radius of the teeth in the second tooth section is preferably 0.001 inches less than the radius of the teeth in the first tooth section. However, in general, the teeth in the second tooth section may be formed at a radius that is less than the radius of the teeth in the first tooth section by an amount that is equal to or greater than the radial runout.

In a further embodiment, the radial runout of the cutting tool may be angularly centered at a first angular position. Preferably, the second tooth sections are substantially aligned with or are angularly coincident with the first angular position in order to maximize the ability to prevent the formation of surface feed marks as a result of the radial runout. In a further embodiment, the first and second tooth sections are preferably respectively diametrically opposed and are also preferably equiangularly spaced about the central axis.

In one embodiment, the fluted portion may include N number of teeth with the second tooth section comprising N/4 of the teeth being formed at a reduced radius relative to the radius of the teeth in the first tooth section. For example, for a 20-tooth cutting tool, the second tooth section may comprise five of the teeth formed at a reduced radius relative to five teeth formed in the first tooth section. In the 20-tooth cutting tool of the example, the first tooth sections are disposed in alternating angular positioning relative to the second tooth sections.

The features, functions, and advantages that have been discussed can be achieved independently in various embodiments of the present invention or may be combined in yet other embodiments, further details of which can be seen with reference to the following description and figures below.

BRIEF DESCRIPTION OF THE DRAWINGS

These and other features of the present invention will become more apparent upon reference to the drawings wherein like numbers refer to like parts there throughout and wherein.

DETAILED DESCRIPTION

Figure 2:
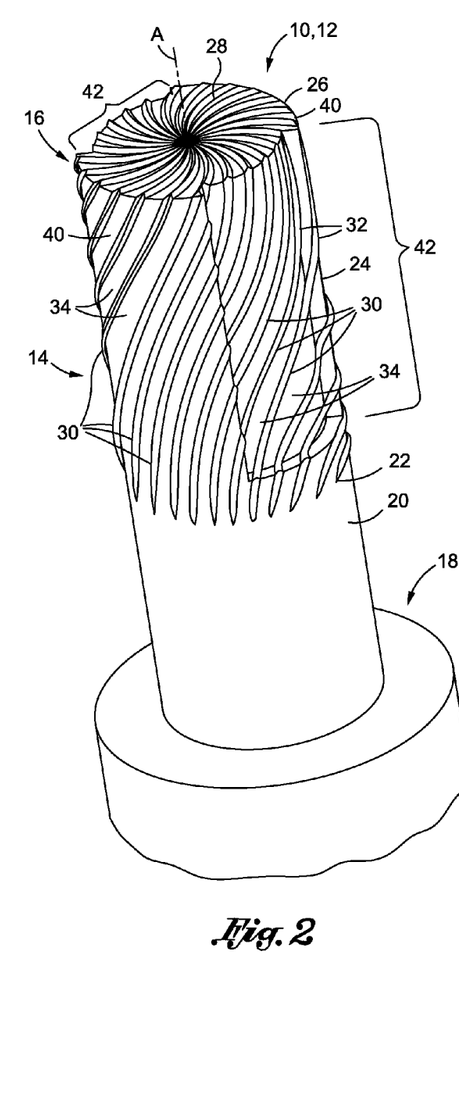
FIG. 2 is a perspective illustration of a cutting tool in one embodiment and illustrating cutting teeth being formed at varying radii around a circumference of the cutting tool.

Referring now to the drawings wherein the showings are for purposes of illustrating preferred and various embodiments of the disclosure only and not for purposes of limiting the same, FIG. 2 is a perspective illustration of a cutting tool 10 or end mill 12, as such terms are used interchangeably throughout this disclosure, and which may be used in various embodiments, methods, apparatuses and systems for minimizing or preventing the occurrence of surface feed marks typically associated with high tooth-count rotary cutting tools. In this regard, the cutting tool 10 and/or end mill 12 as disclosed herein is formed with teeth 30 of varying radii in order to facilitate machining of metallic and/or nonmetallic work pieces at relatively high feed rates without the occurrence of feed marks and thereby avoiding the need for post-machining operations such as hand finishing.

Figure 3:
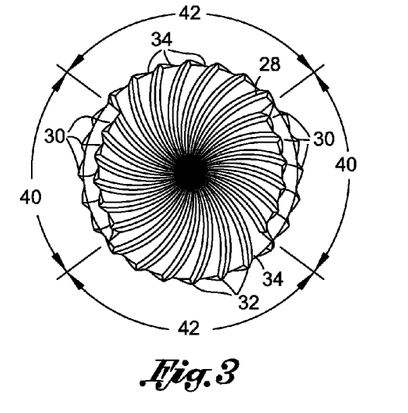
FIG. 3 is an end view of the cutting tool of FIG. 2 and illustrating second tooth sections being formed at a reduced radius relative to first tooth sections formed about the circumference of the cutting tool.
Figure 4:
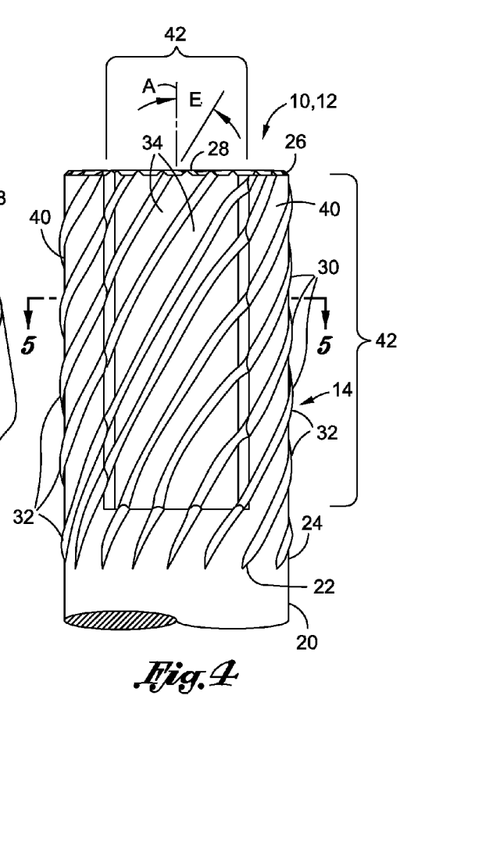
FIG. 4 is a profile illustration of the cutting tool of FIG. 2.

Referring to FIGS. 2-4, the cutting tool 10, in one embodiment, may include a generally cylindrical elongate tool body 14 having opposing proximal and distal ends 18, 16. The tool body 14 defines a central axis A passing therethrough and may include a shank portion 20 and a fluted portion 24. The shank portion 20 is preferably disposed adjacent the proximal end 18 and may be configured to be engageable to a rotary milling machine for rotatably driving the cutting tool 10. In one embodiment, the shank portion 20 may have a shoulder portion on the proximal end 18 as best seen in FIG. 2.

Alternatively, the shank portion 20 may include various surface features or geometric configurations such as a tapered surface or a grooved surface to facilitate the engagement or gripping of the shank portion 20 by a spindle (not shown) of the rotary milling machine. As is known in the art, a spindle may be rotatable about its own axis and may be movable in a variety of axial and lateral directions as well as in angular orientations in order to facilitate movement of the cutting tool 10 relative to the work piece.

As best seen in FIG. 4, the tool body 14 may transition from the shank portion 20 to the fluted portion 24 at a step 22 wherein teeth 30 of the fluted portion 24 may be preferably, but optionally, formed at a slightly larger diameter (i.e., the cutting diameter D) relative to a diameter of the shank portion 20. The fluted portion 24 may carry a plurality of the cutting teeth 30 which may each be separated by a corresponding number of flutes 34 or grooves.

The flutes 34 are preferably sized and configured to facilitate removal of chips from the work piece during machining. Although the shank portion 20 and fluted portion 24 may be cylindrical as shown in FIGS. 2-4, alternative shapes, sizes and configurations of the tool body 14 are contemplated. For example, the fluted portion 24 may have a generally tapered or slightly conical shape to facilitate the forming of a desired contour into the work piece.

Figure 5:
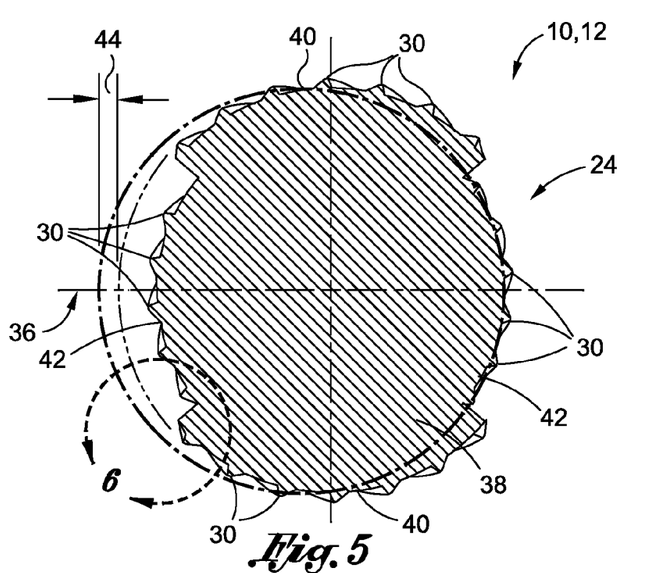
FIG. 5 is a section cut of the cutting tool taken along lines 5-5 of FIG. 4 and illustrating the diametrically opposed first and second tooth sections in one embodiment.
Figure 6:
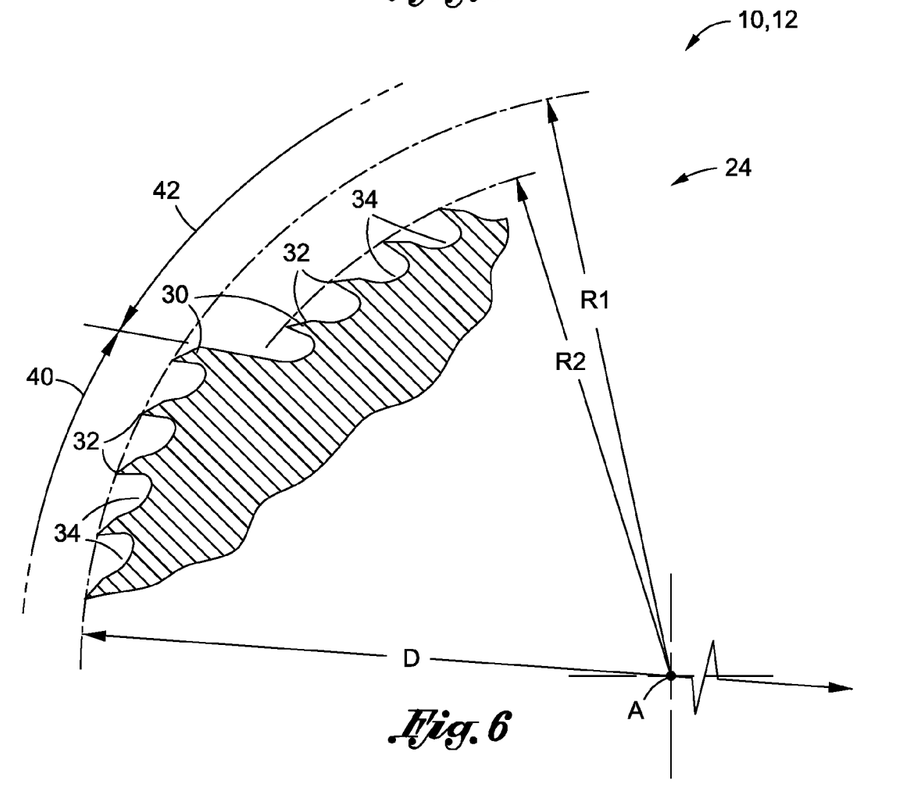
FIG. 6 is an enlarged illustration of the teeth in adjacent first and second tooth sections taken along line 6-6 of FIG. 5 and illustrating a difference in the radii at which the teeth are formed.

As shown in FIGS. 2-6, the cutting tool 10, which may be generally solid or hollow, may have the teeth 30 disposed about a circumference of the fluted portion 24. The teeth 30 in the fluted portion 24 may be formed at varying radii as measured from the central axis A of the cutting tool 10 or end mill 12. The varying radii of the teeth are best seen in FIGS. 5-6 which, in an exemplary embodiment, illustrate the teeth 30 being divided up into first and second tooth sections 40, 42 disposed around the circumference of the fluted portion 24. The differences in radii of the teeth 30 in the first tooth sections 40 relative to the radii of the teeth 30 in the second tooth section 42 are exaggerated or enlarged for exemplary purposes. In this regard, the differences in the radii of the teeth 30 in the first and second tooth sections 40, 42 may be on the order of a few thousands of an inch or less and may therefore be undetectable without magnification.

In one embodiment shown in FIGS. 2, 3 and 5, the fluted portion 24 may have an equal number of first and second tooth sections 40, 42 although alternative arrangements are contemplated wherein the fluted portion 24 includes an uneven or odd number of first and second tooth sections 40, 42. As can be seen in FIGS. 5 and 6, each of the teeth 30 in the first tooth section 40 may be formed at equal radii described herein as the first tooth radius $R_1$. Likewise, each of the teeth 30 in the second tooth section 42 may be formed at equal radii described herein as the second tooth radius $R_2$.

Although the teeth 30 may be formed at equal radii in each of the respective first and second tooth sections 40, 42, it is contemplated that certain advantages may be provided by having teeth 30 of varying radii in the first tooth sections 40. In addition, it is contemplated that certain embodiments of the cutting tool 10 may include teeth 30 of varying radii in each of the second tooth sections 42. However, the preferred embodiment is that which is shown in FIGS. 5-6 wherein the teeth 30 in each of the first and second tooth sections 40, 42 are formed at equal radii, respectively.

Notably, the teeth 30 in the second tooth section 42 may be formed at a reduced radius relative to the radius at which the teeth 30 are formed in the first tooth section 40. In this manner, the teeth 30 in the cutting tool 10 or end mill 12 are formed with at least two different radii which may allow for machining of work pieces at relatively high feed rates such as at around 100 inches per minute (IPM) without the formation of surface feed marks.

Referring to FIG. 5, shown is the cutting tool 10 in one embodiment having a pair of diametrically opposed first tooth sections 40 and a pair of diametrically opposed second tooth sections 42. As can be seen, the first tooth sections 40 and second tooth sections 42 are disposed in alternating angular positions around the circumference of the fluted portion 24 of the cutting tool 10. Although shown as having first and second tooth sections 40, 42, any number may be provided. Furthermore, although the first tooth sections 40 and second tooth sections 42 are each shown as being diametrically opposed, other arrangements are possible.

For example, for configurations of the cutting tool 10 having three of the first tooth sections 40 and three of the second tooth sections 42, an arrangement is contemplated wherein the first and second tooth sections 40, 42 are provided at angular spacings of approximately 60°. In addition, it is contemplated that the cutting tool 10 may be formed with non-uniform angular spacings of the first, second and subsequent tooth sections.

Although shown in FIGS. 2 and 4 as having a generally helical configuration, the teeth 30 may be provided in any arrangement such as straight teeth 30 extending generally parallel to the central axis A. Furthermore, the teeth 30 may be provided in a parabolic configuration. With regard to the helical configuration of the teeth 30 illustrated in FIGS. 2-4, the angle at which the helix of each tooth 30 is formed may be varied.

For example, in one embodiment shown in FIG. 4, the helical angle E at which the teeth 30 may be oriented may be between approximately 0° and 60° relative to the central axis A. However, other helical angles E or variations thereof may be provided. Furthermore, although shown as being generally equiangularly spaced relative to one another, the teeth 30 may be provided in any angular spacing along any portion of the circumference of the fluted portion 24. For example, the first tooth sections 40 may be disposed in non-equiangular arrangement relative to the second tooth sections 42.

As can be seen in FIGS. 2 and 4, the fluted portion 24 may terminate at its free end in any one of a variety of configurations. For example, although shown as having a planar end face 28 on an end portion 26 of the tool body 14, the cutting tool 10 may be provided with a rounded or ball nose configuration on the end portion 26 of the tool body 14. In this regard, the cutting teeth 30 on the circumference may or may not extend along the ball nose or rounded configuration of the end portion 26. Furthermore, the end portion, whether formed as a planar end face 28 or in a ball nose configuration, may be partially or completely devoid of teeth 30.

Referring back to FIG. 5, shown is an exemplary amount of radial runout 44 relative to a cross section 38 of the cutting tool 10. In the example shown, the radial runout 44 is shown as an offset or bias toward the left of the cross section 38 of the fluted portion 24. As was indicated above, such radial runout 44 may be exhibited by the cutting tool 10 during rotation thereof and may be the result of geometrical tolerances of the cutting tool, spindle imbalance, low rigidity of the rotary machining tool and/or cutter/spindle dynamics.

FIG. 5 further illustrates a preferable angular alignment of the second tooth section 42 with a first angular position 36 of the radial runout 44. In a preferable embodiment, at least one of the second tooth sections 42 is substantially aligned or is angularly coincident with the first angular position 36 of the radial runout 44. The first angular position 36 of the radial runout 44 is shown as being aligned with a horizontal axis of the cross section 38 which is coincident with the angular center of the second tooth section 42. By aligning the second tooth section 42 with the first angular position 36 of the radial runout 44, feed marks may be minimized.

In one embodiment, the teeth 30 in the second tooth section 42 are preferably formed at a radius which is less than the radius of the teeth 30 in the first tooth section 40 by an amount that is at least equal to the radial runout 44. In one example, for a radial runout 44 of approximately 0.001 inches, the cutting tool 10 may be formed such that the radii of the teeth 30 in the second tooth section 42 are formed at approximately 0.001 inches less than the radii of the teeth 30 in the first tooth section 40.

Referring briefly to FIG. 4, shown is a side view in one embodiment of the cutting tool 10 illustrating the teeth 30 in the second tooth section 42 extending as continuations of the teeth 30 of the first tooth sections 40 on either side thereof. However, it is contemplated that the teeth 30, or at least the cutting edge(s) 32 thereof, are disposed in the second tooth section 42 as separate from the teeth 30 in the first tooth sections 40. In this regard, each of the teeth 30 may be provided with cutting edges 32 that are segmented or which are non-continuous along a length of the cutting edge 32.

In one embodiment, the cutting tool 10 may be configured such that the fluted portion 24 contains N number of teeth 30. The second tooth section 42 may be provided with teeth 30 according to a relationship wherein N/4 of the teeth 30 are formed at a reduced radius relative to the radius of the teeth 30 in the first tooth section 40. In an example of the above relationship, for a 20-tooth cutting tool (not shown), each of the first and second tooth sections 40, 42 preferably includes five of the teeth 30. Furthermore, the teeth 30 in the second tooth sections 42 are formed at a reduced radius relative to the radius of the teeth 30 in the first tooth sections 40. As can be seen in FIG. 5, the teeth 30 in the first tooth section 40 are formed at a first tooth radius $R_1$ which is preferably greater than the second tooth radius $R_2$. In one embodiment, the first tooth radius $R_1$ may be greater than the second tooth radius $R_2$ by an amount that is at least equal to the radial runout 44 (e.g., 0.001 inches).

Figure 7:
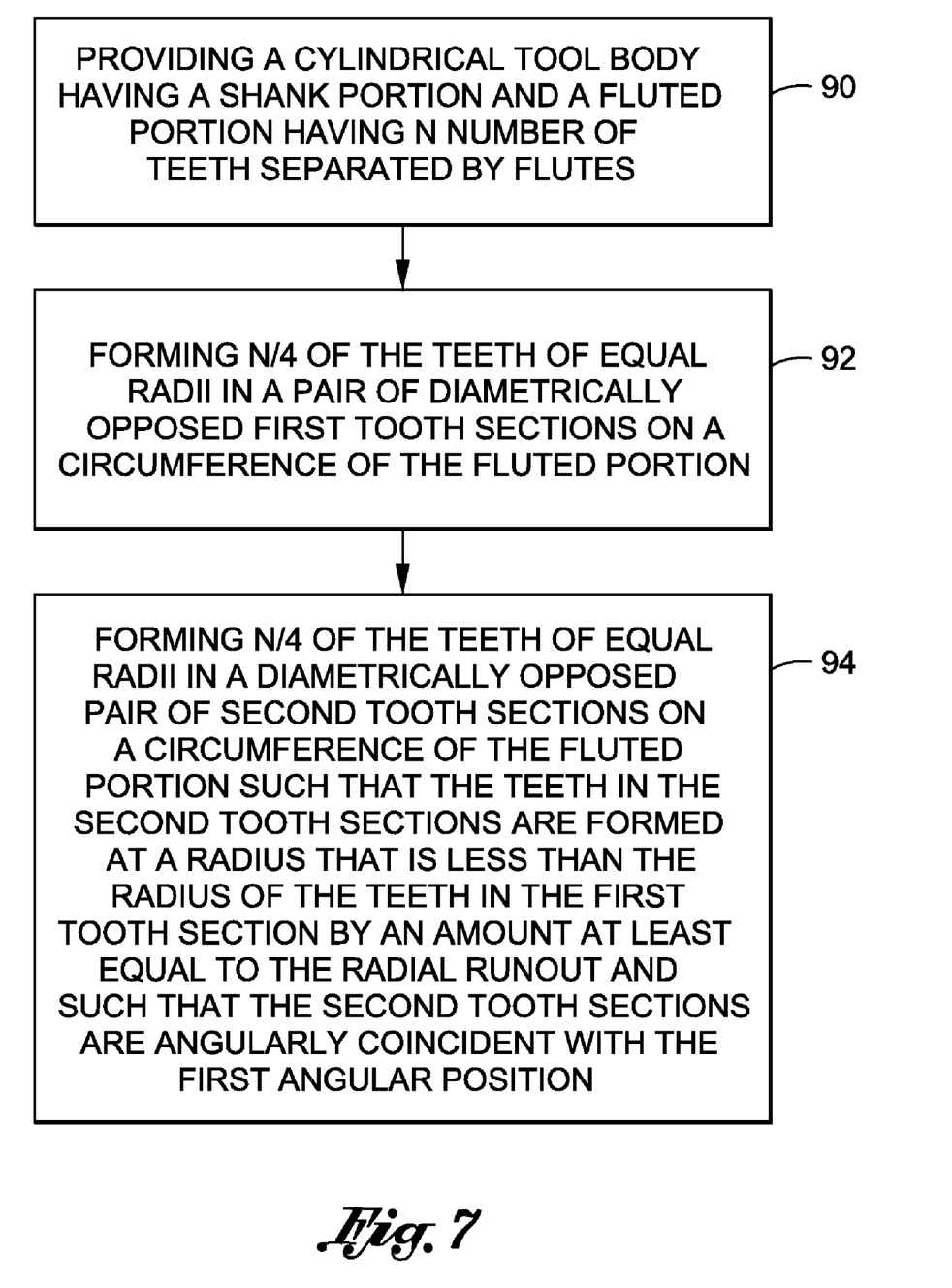
FIG. 7 is a flowchart of a method of forming a cutting tool.

Referring to FIG. 7, shown is a flowchart illustrating an exemplary embodiment of a process or method for forming a cutting tool 10 or end mill 12. As shown in FIG. 7, the method may include step 90 of providing a tool body 14 which may include a shank portion 20 and a fluted portion 24. As was earlier indicated, the tool body 14 may define a central axis A extending along a length of the tool body 14 as shown in FIGS. 2-4.

The fluted portion 24 may carry a plurality of the teeth 30 which may each be separated by a corresponding number of flutes 34. In one embodiment, the fluted portion 24 may carry N number of teeth 30 which are preferably formed on the circumference of the fluted portion 24.

Step 92 may comprise forming at least one of the first tooth sections 40 on the fluted portion 14. In an exemplary embodiment, N/4 of the teeth 30 may be formed in a pair of first tooth sections 40. The first tooth sections 40 may preferably, but optionally, be diametrically opposed from one another on the circumference of the fluted portion 14. The teeth 30 in the first tooth sections 40 are preferably formed at equal radii although it is contemplated that teeth 30 of differing radii may be formed in the first tooth sections 40.

Step 94 may comprise forming at least one of the second tooth sections 42 on the fluted portion 14 wherein N/4 of the teeth 30 are preferably formed in a pair of the second tooth sections 42. The second tooth sections 42 may be diametrically opposed from one another on the circumference of the fluted portion 14 such that the first and second tooth sections 40, 42 are formed in alternating arrangement on the circumference of the fluted portion 14. In a preferable embodiment, the teeth in the second tooth section 42 are formed at a radius that is less than the radius of the teeth in the first tooth section 40 by an amount at least equal to the radial runout 44.

As shown in FIG. 7, step 94 may preferably, but optionally, comprise positioning the second tooth sections 42 to be substantially angularly coincident with the first angular position 36 of the radial runout 44. The teeth 30 may be formed on the fluted section 14 such that the cutting edges 32 thereof are either continuous as shown in FIGS. 2 and 4 or are segmented or non-continuous across the adjacently-disposed first and second tooth sections 40, 42.

Figure 8:
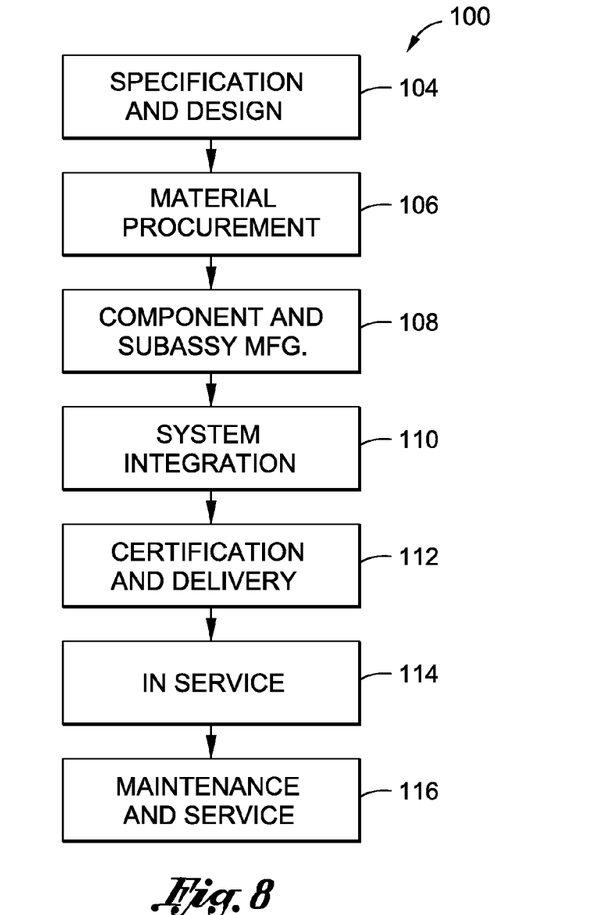
FIG. 8 is a flowchart of an aircraft production and service methodology.
Figure 9:
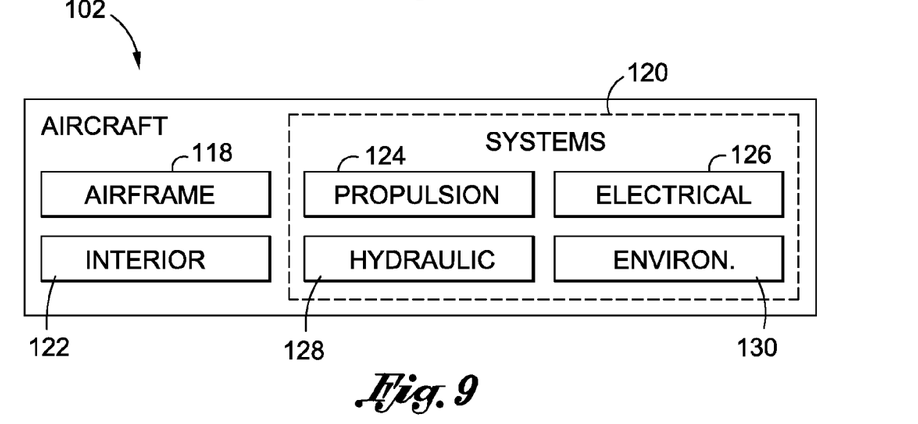
FIG. 9 is a block diagram of an aircraft.

Referring to FIGS. 8-9, embodiments of the disclosure may be described in the context of an aircraft manufacturing and service method 100 as shown in FIG. 8 and an aircraft 102 as shown in FIG. 9. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The above description is given by way of example, and not limitation. Given the above disclosure, one skilled in the art could devise variations that are within the scope and spirit of the embodiments disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A cutting tool, comprising:
   a tool body defining a central axis and including:
      a shank portion; and
      a fluted portion having a plurality of teeth disposed about a circumference thereof, each one of the teeth defining a tooth radius;
   wherein the teeth are divided into first and second tooth sections, the tooth radius of the teeth in the first tooth section being different than the tooth radius of the teeth in the second tooth section, the respective teeth in each of the first and second tooth sections being formed at substantially equal radii;
   at least one tooth in the first tooth section extending as a continuation of a tooth in the second tooth section and having a cutting edge that is non-continuous with a cutting edge of the tooth in the second tooth section.

2. The cutting tool of claim 1 wherein:
   the teeth in the second tooth section are formed at a reduced radius relative to the radius of the teeth in the first tooth section.

3. The cutting tool of claim 1 wherein:
   the teeth in the second tooth section are formed at a radius that is less than the radii of the teeth in the first tooth section by at least approximately 0.001 inch.

4. The cutting tool of claim 1 wherein:
   the first and second tooth sections are approximately equi-angularly spaced about the central axis.

5. The cutting tool of claim 1 wherein:
   the fluted portion includes an equal number of the first and second tooth sections.

6. The cutting tool of claim 1 wherein:
   the fluted portion includes an even number of the first tooth sections and an even number of the second tooth sections;
   the first tooth sections being diametrically opposed.

7. The cutting tool of claim 1 wherein:
   the fluted portion including N number of teeth;
   at least one of the second tooth sections comprising N/2 of the teeth divided by the number of second tooth sections;
   the teeth in the at least one second tooth section being formed at a reduced radius relative to the teeth in the first tooth section.

8. An end mill, comprising:
   a cylindrical tool body having opposing proximate and distal ends and defining a central axis and including:
      a shank portion disposed adjacent the proximate end and being configured to be rotatably driven; and
      a fluted portion disposed adjacent the distal end and having a plurality of teeth disposed about a circumference thereof, the teeth being separated by flutes, each one of the teeth defining a tooth radius as measured from the central axis;
   wherein the teeth are divided into first and second tooth sections, the tooth radius of the teeth in the first tooth section being different than the tooth radius of the teeth in the second tooth section the respective teeth in each of the first and second tooth sections being formed at substantially equal radii;
   at least one tooth in the first tooth section extending as a continuation of a tooth in the second tooth section and having a cutting edge that is non-continuous with the cutting edge of the tooth in the second tooth section.

9. The end mill of claim 8 wherein:
   the teeth in the second tooth section being formed at a reduced radius relative to the radius of the teeth in the first tooth section.

10. The end mill of claim 8 wherein:
    the teeth in the second tooth section are formed at a radius that is less than the radii of the teeth in the first tooth section by at least approximately 0.001 inch.

11. The end mill of claim 8 wherein:
    the first and second tooth sections are approximately equi-angularly spaced about the central axis.

12. The end mill of claim 8 wherein:
    the fluted portion includes an equal number of the first and second tooth sections.

13. The end mill of claim 8 wherein:
    the fluted portion includes an even number of the first tooth sections and an even number of the second tooth sections;
    the first tooth sections being diametrically opposed.

14. The end mill of claim 8 wherein:
    the fluted portion includes N number of teeth;
    at least one of the second tooth sections comprising N/2 of the teeth divided by the number of second tooth sections;
    the teeth in the at least one second tooth section being formed at a reduced radius relative to the teeth in the first tooth section.

15. An end mill for minimizing the occurrence of feed marks in a work piece, comprising:
    a cylindrical tool body having opposing proximate and distal ends and defining a central axis and including:
    a shank portion disposed adjacent the proximate end and being configured to be rotatably driven; and
    a fluted portion disposed adjacent the distal end and having N number of teeth disposed about a circumference thereof, the teeth being separated by flutes, each one of the teeth defining a tooth radius as measured from the central axis;
    wherein:
    the teeth are divided into a pair of diametrically opposed first tooth sections and a pair of diametrically opposed second tooth sections;
    each one of the first and second tooth sections comprising N/4 of the teeth;
    the respective teeth in each of the first and second tooth sections being formed at substantially equal radii;
    the teeth in the second tooth section being formed at a radius that is less than the radius of the teeth in the first tooth section;
    at least one tooth in the first tooth section extending as a continuation of a tooth in the second tooth section and having a cutting edge that is non-continuous with a cutting edge of the tooth in the second tooth section.

16. A method of machining a work piece, comprising the steps of:
providing a cutting tool having a fluted portion, the fluted portion having a plurality of teeth disposed about a circumference thereof, each one of the teeth defining a tooth radius, the teeth being divided into first and second tooth sections, the tooth radius of the teeth in the first tooth section being different than the tooth radius of the teeth in the second tooth section the respective teeth in each of the first and second tooth sections being formed at substantially equal radii;
providing the cutting tool such that at least one tooth in the first tooth section extends as a continuation of a tooth in the second tooth section and having a cutting edge that is non-continuous with a cutting edge of the tooth in the second tooth section;
rotating the cutting tool; and
removing material from the work piece using the teeth during rotation of the cutting tool.

17. The method of claim 16 further comprising the step of:
providing the cutting tool such that the teeth in the second tooth section are formed at a reduced radius relative to the radius of the teeth in the first tooth section.

18. The method of claim 16 further comprising the step of:
providing the cutting tool such that the teeth in the second tooth section are formed at a radius that is less than the radii of the teeth in the first tooth section by at least approximately 0.001 inch.

19. The method of claim 16 further comprising the step of:
providing the cutting tool with an equal number of the first and second tooth sections.

20. The method of claim 16 further comprising the step of:
providing the cutting tool with an even number of the first tooth sections and an even number of the second tooth sections, the first tooth sections being diametrically opposed.

* * * * *